United States Patent [19]

Ogawa

[11] Patent Number: 5,798,987
[45] Date of Patent: Aug. 25, 1998

[54] LOW NOISE MAGNETO-OPTICAL DISK DRIVE

[75] Inventor: Masatsugu Ogawa, Tokyo, Japan

[73] Assignee: NEC Corporation, Tokyo, Japan

[21] Appl. No.: 839,596

[22] Filed: Apr. 15, 1997

[30] Foreign Application Priority Data

Apr. 15, 1996 [JP] Japan ................ 8-092081

[51] Int. Cl.$^6$ ................................ G11B 11/00
[52] U.S. Cl. ........................... 369/13; 369/275.4
[58] Field of Search ................. 369/13, 275.4, 369/275.1, 275.2, 280; 428/694 ML

[56] References Cited

U.S. PATENT DOCUMENTS

| | | | |
|---|---|---|---|
| 5,406,546 | 4/1995 | Uchiyama et al. | 369/275.4 |
| 5,430,706 | 7/1995 | Utsunomiya et al. | 369/275.1 |
| 5,504,734 | 4/1996 | Morita | 369/275.4 |
| 5,517,486 | 5/1996 | Haneda | 369/280 |
| 5,581,539 | 12/1996 | Horie et al. | 369/275.4 |
| 5,602,825 | 2/1997 | Sugaya et al. | 369/275.4 |
| 5,682,375 | 10/1997 | Imataki | 369/275.4 |

OTHER PUBLICATIONS

T. Iwanaga, "High Density Land/Groove Recording", *Proceedings of Magneto–Optical Recording International Symposium '94, J. Magn. Soc. Jpn.*, vol. 19, Supplement No. S1, 1995, 1994, pp. 289–294 (No Month Available).

*Primary Examiner*—Tan Dinh
*Attorney, Agent, or Firm*—Sughrue, Mion, Zinn, Macpeak & Seas, PLLC

[57] ABSTRACT

A magneto-optical disk drive comprises a magneto-optical disk having a land area and a groove area both for recording data therein. The disk drive emits a laser beam having a first wavelength and including a TM wave and a TE wave. Each of slope wall width of the groove, groove or land width and groove depth has a specified value defined with respect to the first wavelength for obtaining a low noise output. The preferred width for the slope walls is above $\frac{1}{4}n$ or $\frac{1}{8}n$ to $\frac{1}{6}n$ of the first wavelength and preferred groove depth is $\frac{1}{8}n$ to $\frac{1}{5}n$ of the first wave length, wherein n is a refractive index for the laser beam.

25 Claims, 5 Drawing Sheets

LOW NOISE MAGNETO-OPTICAL DISK DRIVE

BACKGROUND OF THE INVENTION (a) Field of the Invention

The present invention relates to a low noise magneto-optical disk drive and, more particularly, to a structure of a low noise disk in a magneto-optical disk drive having a higher recording density.

(b) Description of the Related Art

Optical disks generally have guide grooves for guiding optical spots of a laser in a tracking servo system of a magneto-optical disk drive in order to improve reliability of recording and reproduction of data. A single guide groove is arranged alternately with a land area in a spiral arrangement or a plurality of guide grooves are arranged alternately with a plurality of lands in a concentric arrangement. In this text, the description is given for the case of the single guide groove as an example.

The optical spot is guided by the guide groove while using a push-pull signal for the tracking servo system. If the optical disk has a guide groove which has not a uniform shape, i.e., uniform width or depth of the guide groove, the amount of reflected light varies along the guide groove and thereby involves a significant amount of noise in the reproduced output signal.

The substrate of the magneto-optical disk having a guide groove thereon is fabricated by a mastering process for forming a stamper or die having a negative profile of the optical disk and a subsequent stamping process for printing the information recorded on the stamper to the resultant optical disk. The stamping process uses injection, compression or other techniques such as photo-polymerization to shape the optical disk. If a guide groove having a uniform width is requested, an exact replica in the stamper and an accurate printing therefrom are particularly important.

It is difficult, however, to obtain an exact shape of the stamper and to press the optical disk with an accuracy from the stamper due to the limited current fabrication technology and apparatus, thereby raising a noise level in the output signal of the optical disk. The higher the recording density becomes and the narrower the guide groove becomes, the more the width uniformity of the guide groove degrades thereby making the noise problem serious.

SUMMARY OF THE INVENTION

In view of the above, it is an object of the present invention to provide a low noise magneto-optical recording disk drive having a magneto-optical disk of a high recording density.

The present invention provides a magneto-optical recording disk drive including an optical head for irradiating a laser beam having a first wavelength and including at least one of a TM wave and a TE wave for recording/reproducing; and a magneto-optical disk irradiated by the laser beam. The magneto-optical disk has a substrate for defining thereon alternately a land area and a groove area along the radial direction of the disk. The groove area has a bottom and a pair of slope walls, a magneto-optical film overlies the substrate, and a transparent film having a refractive index of n either overlies or underlies the magneto-optical film for passing a signal light to the magneto-optical film. Each of the slope walls has a width which is equal to or larger than approximately ¼n of the first wavelength, or between ⅛n and ⅙n of the first wavelength. A preferred depth of the groove is ⅛n to ⅕n of the first wavelenght.

In accordance with the magneto-optical disk drive of the present invention, a low noise output signal can be obtained from the magneto-optical disk by the specified configuration.

The above and other objects, features and advantages of the present invention will be more apparent from the following description, referring to the accompanying drawings.

PREFERRED EMBODIMENTS OF THE INVENTION

Figure 1:
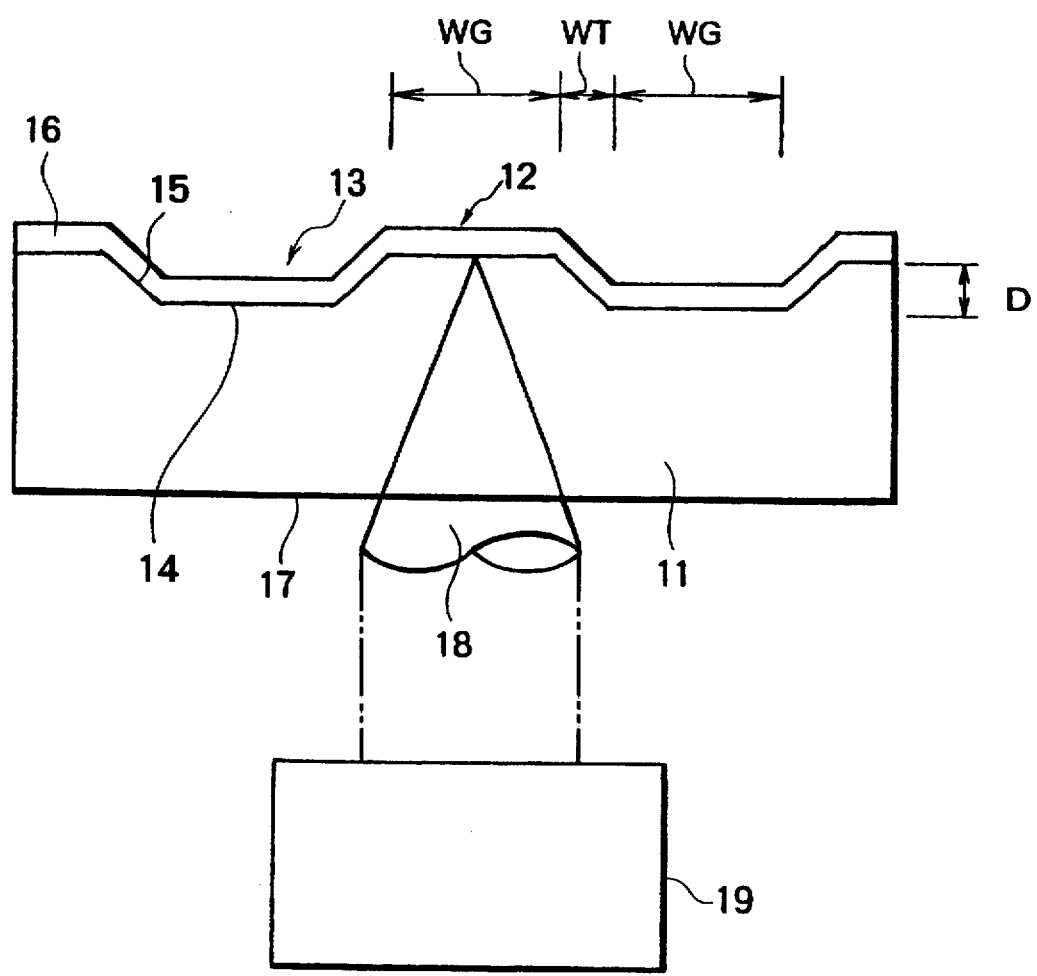
FIG. 1 is a sectional view of a magneto-optical recording disk in a magneto-optical disk drive according to an embodiment of the present invention, taken along a line passing through the center of the disk.

Now, the present invention will be described in more detail with reference to the accompanying drawings. FIG. 1 shows a magneto-optical recording disk according to an embodiment of the present invention. The magneto-optical disk has a substrate 11 made of a transparent material such as polycarbonate on which a magneto-optical film 16 is formed by, for example, sputtering. The top surface of the substrate 11 has a periodic structure along the radial direction of the disk, each period including a land area 12 and a groove area 13 having a flat bottom 14 and a pair of slope walls 15. The width of the land 12 and the width of the bottom 14 are referred to as a groove width WG herein, and the width of the slope 15 and depth of the groove 13 are designated as WT and D, respectively, in the drawing. Each of the land area 12 and bottom 14 of the groove area 13 has information data thereon implemented by the length of a pit.

An optical beam 18 having a wavelength λ and emitted by an optical head 19 of the disk drive is incident from the back surface 17 of the substrate 11 to be reflected by the magneto-optical film 16 while including information recorded on the magneto-optical film 16. The amount of a specified polarized wave component of the reflected light is measured by the optical head 19 to provide an output signal representing the information recorded in both the land area and groove area.

The optical beam 18 generally includes a TM wave (transverse magnetic polarized light) or a TE wave (transverse electric polarized light) depending on the location of the information data to be reproduced, i.e. land area 12 or groove area 13 of the magneto-optical film. Specifically, a TM wave and a TE wave are generally used for reproducing the information data on the land area 12 and groove area 13, respectively, because a larger amplitude can be generally obtained in this case among others. However, the magneto-optical recording disk of the present embodiment allows a TM wave, as well as a TE wave, to be used for reproducing the data stored in the groove area 13 because of the low noise characteristic of the optical disk.

Signal characteristics were obtained during reproduction of the data from optical disks having a groove width WG of 680 nanometers (nm) and a slope depth D of 85 nm, with the slope width WT being a parameter. The reproduction is executed from a land area and a groove area each by using both a TM wave and a TE wave, the TM wave having a polarization plane perpendicular to the groove or land area and the TE wave having a polarization plane parallel to the groove or land area. The wavelength λ of the optical beam was 680 nm which was equal to the groove width WG.

Figure 2:
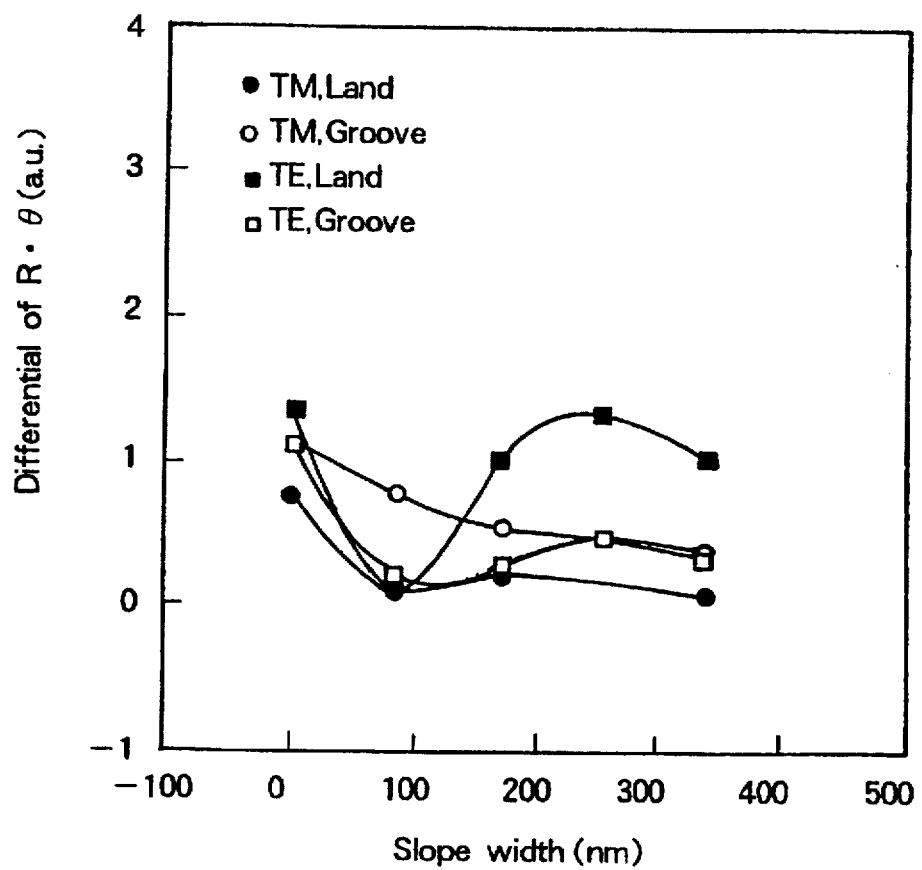
FIG. 2 is a graph showing the relationship between the slope width of the groove and differential of the product (R·θ) of the reflected light (R) and rotational angle (θ) provided by a Kerr effect.

FIG. 2 shows the result of each case of the reproduction. In FIG. 2, the notation, for example, "TM, Land" means a reproduction wherein the TM wave was used for reproduction of the data from the land area. The larger differential of R·θ) generally implies that a larger variation of the output is involved based on the variation of the slope width, to thereby include larger noise in the output signal. In FIG. 2, it will be understood that the slope width WT above about 170 nm which is a quarter of the groove width WG provides a relatively small differential of R·θ except for the case of "TE, Land" reproduction. That is, WT>WG/4 provides a low noise magneto-optical disk for "TM, Groove", TE, Groove" and "TM, Land" reproduction.

"TE, Land" reproduction provides a minimal differential of R·θ at a slope width which is between 1/8 and 1/6 of the wavelength λ of the incident light. That is, the slope width between 1/8 and 1/6 of the wavelength of the incident light provides a low noise magneto-optical disk for the "TE, Land" reproduction.

Figure 3:
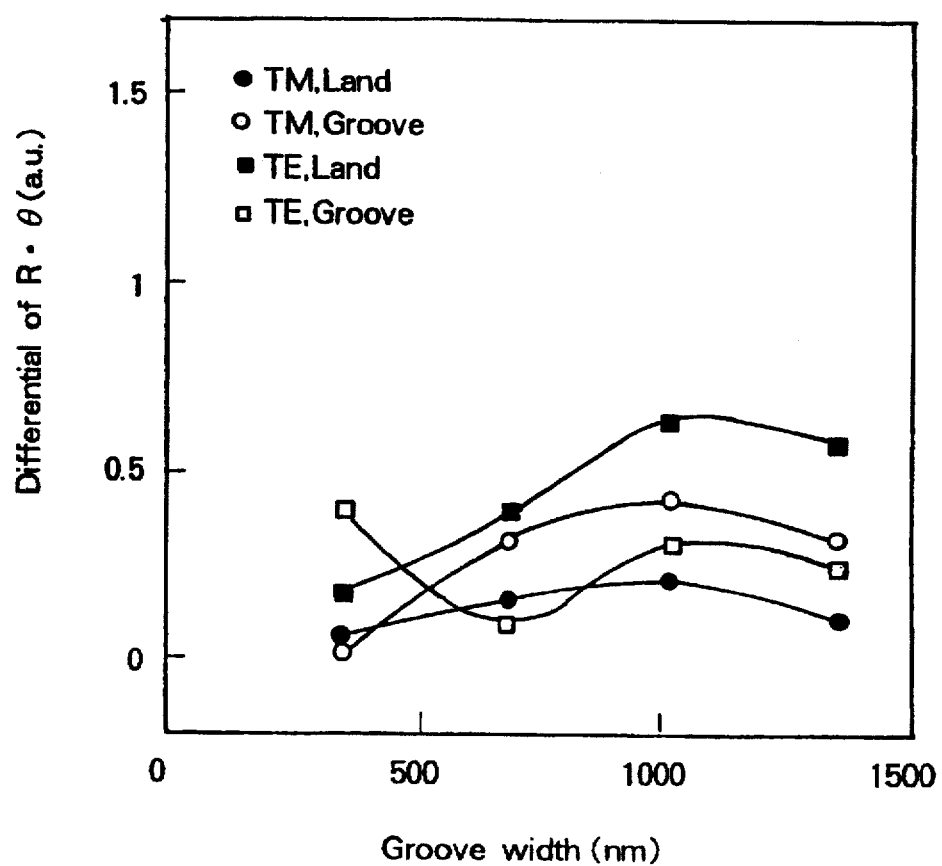
FIG. 3 is a graph showing the relationship between the width of the groove (and also the width of the land) and the differential of R·θ.

FIG. 3 shows another graph showing the relationship between the differential of R·θ and the groove width WG, for each case of the reproduction as described above. The wavelength λ of the incident light, slope width WT and groove depth D are fixed at 680 nm, 200 nm, and 85 nm, respectively. The groove width WG which is equal to or below 1.0 times the wavelength λ provides a relatively small differential of R·θ, and accordingly a low noise magneto-optical disk, for the case of a slope width WT being equal to or above 1/8 of the wavelength λ.

Figure 4:
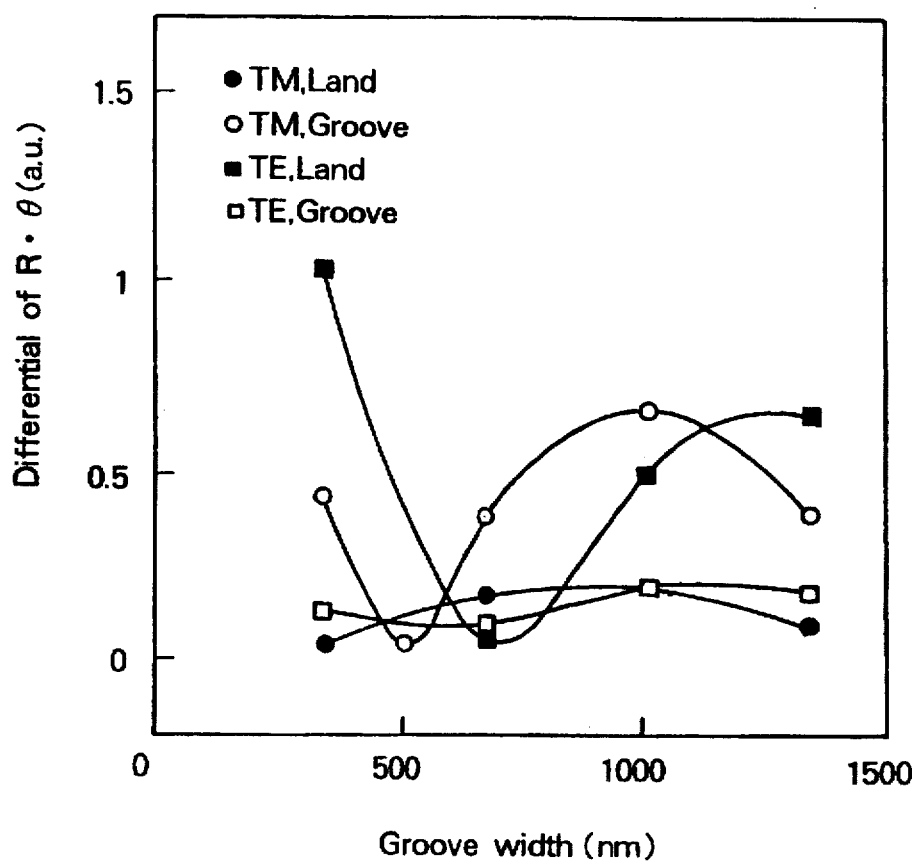
FIG. 4 is a graph showing the relationship between the width of the groove and the differential of R·θ.

FIG. 4 shows another graph similarly to FIG. 3. FIG. 4 is obtained for the case of the wavelength λ, slope width WT and groove depth D being 680 nm, 20 nm and 85 nm, respectively.

The groove width WG which is between 0.8 and 1.2 times the wavelength λ provides a minimal point or a relatively low level of the differential of R·θ for the range of slope width WT being equal to or below 1/8 of the wavelength for each reproduction.

That is, the slope width WT which is equal to or below 1/8 of the wavelength λ and the groove width WG which is between 0.8 and 1.2 times the wavelength λ provides a low noise magneto-optical disk.

If the groove depth D is varied, the amount of the reflected light has a minimal point due to the light interference at the wave depth D which is 1/4 of the wavelength. This phenomenon implies that the groove depth D which is 1/4 of the wavelength λ provides a low noise magneto-optical disk due to the low variation of the amount of the reflected light depending on the variation of the groove depth. In this case, however, a push-pull signal for the tracking servo system cannot be obtained, as a result of which it is difficult to determine the groove depth D for providing the low noise level. The groove depth D which is equal to or below 1/2 of the wavelength provides a different situation wherein TE wave is incident within the groove area itself. In this situation, the minimal amount of the reflected light appears at the groove depth D which is below 1/4 of the wavelength λ to thereby provide a convenient condition wherein a push-pull signal can be obtained to lower the noise caused by the variation of the groove depth.

Figure 5:
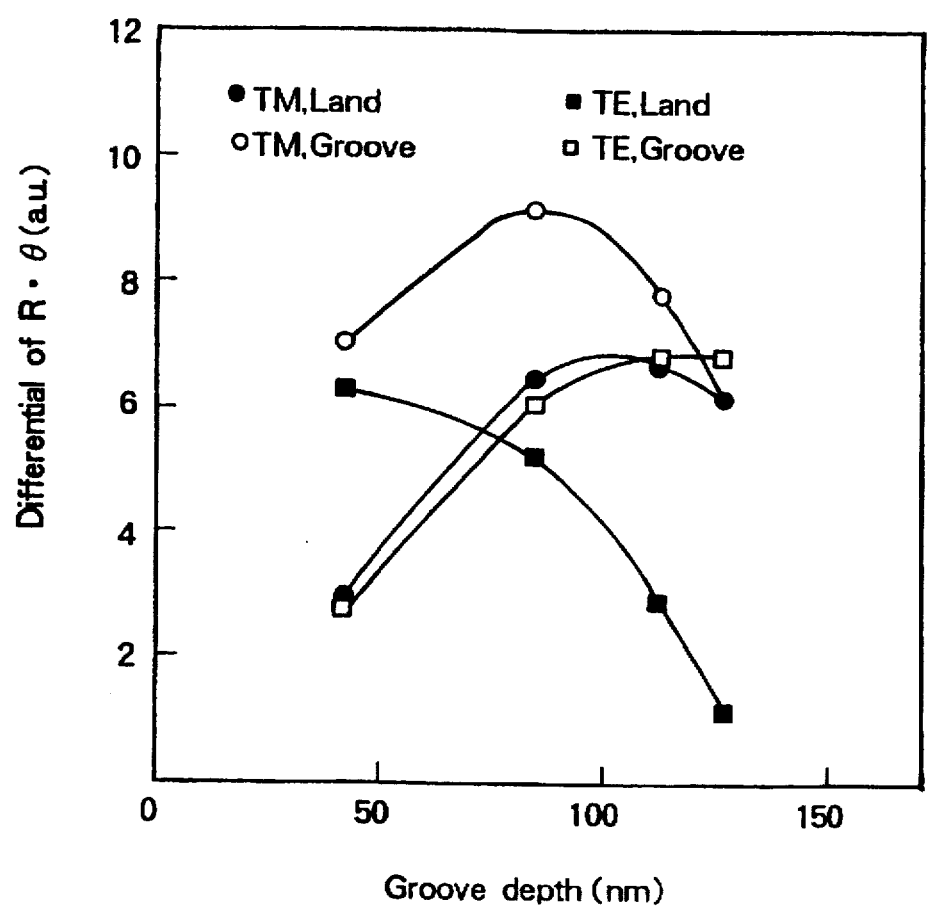
FIG. 5 is a graph showing the relationship between the depth of the groove and the differential of R·θ.

FIG. 5 shows another graph showing the relationship between the differential of R·θ and the groove depth for each case of the reproduction, wherein the wavelength λ of the incident light, groove width WG and slope width WT are 680 nm, 340 nm and 20 nm. It is noted that "TE, Land" reproduction provides a relatively low level of the differential of R·f at the groove depth D which is between 1/8 and 1/5 of the wavelength. That is, the groove width WG which is 1/2 of the wavelength and the groove depth D which is between 1/8 and 1/5 of the wavelength provide a low noise optical disk.

If a transparent film having a refractive index of "n" (n>1) is provided in the optical path of the optical disk in front of the magneto-optical film, the slope depth WT, groove width WG and groove depth D as recited above should be divided by "n" to provide a similar result.

EXAMPLE 1

A magneto-optical disk having a polycarbonate substrate was fabricated according to the embodiment, wherein the groove width WG, slope width WT and groove depth D were 600 nm, 85 nm and 85 nm, respectively. The optical disk had a magneto-optical layer made of a GdFeCo film and a TbFeCo film and an aluminum film formed on the magneto-optical layer as a passivation film. The magneto-optical disk was subjected to reproduction using an objective lens having a numerical aperture (NA) of 0.55 and a laser incident from the back surface of the substrate. The laser had a wavelength of 685 nm. The magneto-optical disk thus fabricated exhibited at least 1.5 dB noise reduction for each case of the reproduction. In particular, the "TM, land" reproduction exhibited as high as 2.0 dB noise reduction.

EXAMPLE 2

A magneto-optical disk similar to Example 1 except for a groove width WG of 680 nm, a slope width WT of 50 nm and groove depth D of 85 nm was fabricated and subjected to reproduction as in Example 1. The magneto-optical disk exhibited an approximate 1.5 dB noise reduction for each case of the reproduction.

EXAMPLE 3

Another magneto-optical disk similar to Embodiment 1 except for a groove width WG of 500 nm, a slope width WT of 180 nm and a groove depth D of 85 nm was fabricated and subjected to reproduction as in Example 1. The magneto-optical disk exhibited an approximate 1.5 dB noise reduction for each case of the reproduction.

EXAMPLE 4

Another magneto-optical disk similar to Embodiment 1 except for a groove width of 340 nm, a slope width of 50 nm and a groove depth of 105 nm was fabricated and subjected to reproduction as in Example 1. The magneto-optical disk exhibited a 2.5 dB noise reduction for each case of the reproduction.

EXAMPLE 5

Another magneto-optical disk having a polycarbonate substrate was fabricated according to another embodiment, wherein the groove width WG, slope width WT and groove depth D were 680 nm, 100 nm and 85 nm, respectively. The optical disk had a 66-nm thick SiNx film formed on the substrate, a magneto-optical layer of a 30-nm thick GdFeCo and a 30-nm thick TbFeCo formed on the SiNx film, and a passivation layer formed on the magneto-optical layer and including a 130-nm thick second SiNx film and a 40-nm thick aluminum film. The formula SiNx represents silicon nitride having a crystal defect at N position and has a refractive index between 2.0 and 2.2 for the laser having a wavelength of 685 nm.

The magneto-optical disk was subjected to reproduction using an objective lens having a numerical aperture (NA) of 0.55 and a reflected laser which had a wavelength of 685 nm and was incident from the back surface of the substrate through the SiNx film to the magneto-optical film. The magneto-optical disk exhibited a 1.5 dB noise reduction compared to a conventional disk for each case of the reproduction except for the "TE, Land". The "TE, land" reproduction exhibited a 0.5 dB noise reduction. By this example, it was confirmed that the slope width WT which was equal to or greater than 1/8n, (i.e., 43 nm) provided a significant noise reduction.

Although Examples for the magneto-optical disk according to the embodiments of the present invention as recited above are of a back-surface incidence type wherein a laser beam is incident from the back surface of the substrate, the present invention can be also applied to a magneto-optical disk of a top-surface incidence type wherein a laser beam is incident from the top surface of the magneto-optical disk.

Similarly, the present invention is not limited to a reflective type of the magneto-optical disk wherein the reflected laser is used for reproduction, but is also applicable to a magneto-optical disk of a transparent type wherein a penetrated laser beam is used for reproduction. Moreover, the present invention is applicable to a card type magneto-optical disk. The present invention is not limited to the specified configuration of the magneto-optical disk wherein the land area and the bottom of the groove area are arranged in symmetry with respect to the slope area, but is applicable to any magnetic-optical disk the one provided that the disk satisfies the structural limitation as described above.

In the magneto-optical disk according to the preferred embodiment of the present invention, the groove information relating to the groove width, groove depth or slope width as well as the information of the incident light obtained by calculation from the groove information should be recorded on the magneto-optical disk for allowing the disk drive to read them. In this case, the magneto-optical disk drive can easily select the specified wave of the incident light for reproduction from the magneto-optical disk.

Although the present invention is described with reference to preferred embodiments thereof, the present invention is not limited thereto and various modifications or alterations can be easily made from the embodiments by those skilled in the art without departing from the scope of the present invention as set forth in the appended claims.

What is claimed is:

1. A magneto-optical disk drive comprising: an optical head for irradiating a laser beam having a first wavelength and including at least one of a TM wave and a TE wave for recording/reproducing; and a magneto-optical disk irradiated by said laser beam, said magneto-optical disk having a substrate for defining thereon alternately a land area and a groove area along the radial direction of said disk, said groove area having a bottom and a pair of slope walls, a magneto-optical film overlying said substrate, each of said slope walls having a width which is equal to or larger than approximately 1/4 of said first wavelength.

2. A magneto-optical disk drive as defined in claim 1 further including a transparent film formed on said magneto-optical film for passing a laser beam therethrough to said magneto-optical film and having a refractive index of n, wherein each of said slope walls has a width which is equal to or larger than approximately 1/4n of said first wavelength.

3. A magneto-optical disk drive as defined in claim 2 wherein said groove has a depth between 1/8n and 1/5n of said first wavelength and both said land area and the bottom of said groove have a width equal to or lower than 1/2n of said first wavelength.

4. A magneto-optical disk drive as defined in claim 1 wherein said magneto-optical film stores data on portions corresponding to said land area and groove area.

5. A magneto-optical disk drive as defined in claim 4 wherein said TM wave is irradiated to said land area and said TE wave or said TM wave is irradiated to said groove area.

6. A magneto-optical disk drive as defined in claim 1 wherein at least one of said land area and the bottom of said groove area has a width which is equal to or smaller than 1.0 times said first wavelength.

7. A magneto-optical disk as defined in claim 1 wherein said groove has a depth between 1/8 and 1/5 of said first wavelenght and both said land area and the bottom of said groove have a width equal to or lower than 1/2 of said first wavelength.

8. A method for recording/reproducing data on a magneto-optical disk comprising the steps of:

providing a magneto-optical disk as defined in claim 7;

irradiating said magneto-optical disk with an optical head that emits a light beam having a first wavelength;

measuring light reflected by said magneto-optical disk;

providing a signal based on said measurement of reflected light.

9. A magneto-optical disk drive comprising: an optical head for irradiating a laser beam having a first wavelength and including at least one of a TM wave and a TE wave for recording/reproducing; and a magneto-optical disk irradiated by said laser beam, said magneto-optical disk having a substrate for defining thereon alternately a land area and a groove area along the radial direction of said disk, said groove area having a bottom and a pair of slope walls, a magneto-optical film overlying said substrate, each of said slope walls having a width between approximately 1/8 and 1/6 of said first wavelength.

10. A magneto-optical disk drive as defined in claim 9 further including a transparent film formed on said magneto-optical film for passing a laser beam therethrough to said magneto-optical film and having a refractive index of n, wherein each of said slope walls has a width which is between 1/8n and 1/6n of said first wavelength.

11. A magneto-optical disk drive as defined in claim 10 wherein said groove has a depth between 1/8n and 1/5n of said first wavelength.

12. A magneto-optical disk drive as defined in claim 9 wherein the width of each of said slope walls is smaller than approximately 1/6 of said first wavelength.

13. A magneto-optical disk drive as defined in claim 9 wherein said magneto-optical film stores data on portions corresponding to said land area and groove area.

14. A magneto-optical disk drive as defined in claim 9 wherein at least one of said land area and the bottom of said groove area has a width which is equal to or smaller than 1.0 times said first wavelength.

15. A magneto-optical disk drive as defined in claim 9 wherein said groove has a depth between 1/8 and 1/5 of said first wavelength.

16. A method for recording/reproducing data on a magneto-optical disk comprising the steps of:
providing a magneto-optical disk as defined in claim 15;
irradiating said magneto-optical disk with an optical head that emits a light beam having a first wavelength;
measuring light reflected by said magneto-optical disk;
providing a signal based on said measurement of reflected light.

17. A magneto-optical disk drive comprising: an optical head for irradiating a laser beam having a first wavelength and including at least one of a TM wave and a TE wave for recording/reproducing; and a magneto-optical disk irradiated by said laser beam, said magneto-optical disk having a substrate for defining thereon alternately a land area and a groove area along the radial direction of said disk, said groove area having a bottom and a pair of slope walls, a magneto-optical film overlying said substrate, each of said slope walls having a width which is equal to or smaller than approximately $1/8$ of said first wavelength, at least one of said land area and groove area having a width between 0.8 and 1.2 times said first wavelength.

18. A magneto-optical disk drive as defined in claim 17 further including a transparent film formed on said magneto-optical film for passing a laser beam therethrough to said magneto-optical film, said trasparent film and having a refractive index of n, wherein each of said slope walls has a width which is equal to or smaller than approximately $1/8n$ of said first wavelength, at least one of said land area and groove area has a width between 0.8/n and 1.2/n of said first wavelength.

19. A magneto-optical disk drive as defined in claim 18 wherein said groove has a depth between $1/8n$ and $1/5n$ of said first wavelength.

20. A magneto-optical disk drive as defined in claim 17 wherein said magneto-optical film stores data on portions corresponding to said land area and groove area.

21. A magneto-optical disk drive as defined in claim 17 wherein said groove has a depth between $1/8$ and $1/5$ of said first wavelength.

22. A method for recording/reproducing data on a magneto-optical disk comprising the steps of:
providing a magneto-optical disk as defined in claim 21;
irradiating said magneto-optical disk with an optical head that emits a light beam having a first wavelength;
measuring light reflected by said magneto-optical disk;
providing a signal based on said measurement of reflected light.

23. The method according to claim 8, wherein said step of irradiating further comprises irradiating said groove area with a TM wave.

24. The method according to claim 16, wherein said step of irradiating further comprises irradiating said groove area with a TM wave.

25. The method according to claim 22, wherein said step of irradiating further comprises irradiating said groove area with a TM wave.

* * * * *